United States Patent Office 3,677,741
Patented July 18, 1972

3,677,741
METHOD OF PROCESSING FERROPHOSPHORUS
Jurgen A. Stenzel, Brentwood, Mo., assignor to
Monsanto Company, St. Louis, Mo.
No Drawing. Filed Aug. 24, 1970, Ser. No. 66,649
Int. Cl. C21c 7/02; C22b 5/00
U.S. Cl. 75—28                                            9 Claims

ABSTRACT OF THE DISCLOSURE

Phosphorus is substantially completely removed from ferrophosphorus by heating the ferrophosphorus in admixture with an oxidizing agent and a neutralizing agent to at least sintering temperature in a container having oxide refractory walls and leaching with an alkaline solution. The residual phosphorus free metal values have recognized utility in the metallurgical industry and the phosphates are useful in fertilizer, feed and detergent technology.

BACKGROUND OF THE INVENTION

This invention relates to a method of processing ferrophosphorus to substantially completely remove phosphorus therefrom. Further, the invention relates to recovering phosphorus and metal values from ferrophosphorus in commercially usable form.

Ferrophosphorus is a by-product of the well-known electric furnace processes for production of elemental phosphorus. Depending upon the compositions of ore fed to the furnace, the ferrophosphorus generally consists of 20 to 30% phosphorus and from 55 to 80% iron. In addition, particularly when processing phosphorus ores from the Western United States, the ferrophosphorus will contain valuable quantities of chromium, vanadium, and nickel. For example, a typical ferrophosphorus resulting from electric furnace processing of Western phosphorus ore contains about 26% phosphorus, 57% iron, 6% chromium, 8% vanadium, and 2% nickel by weight.

It is well recognized by those skilled in the art that the individual constituents of ferrophosphorus of this type are valuable commercial commodities. However, a major portion of these constituents has hitherto been relegated to the category of waste in view of the lack of an economically practical means for their recovery. A major problem in this regard has been the separation of phosphorus values from the ferrophosphorus. The presence of even minor amounts of phosphorus in association with metal values such as chromium and vanadium renders these metal values undesirable for use in the metallurgical industries.

The recovery of vanadium values from ferrophosphorus by means of soda or salt roast processes is known and practiced commercially but in processes of this type the remaining components of ferrophosphorus, usually over 90% by weight, are wasted.

Attempts have also been made to oxidize ferrophosphorus by heating with iron ore and soda ash in silicon carbide crucibles and to remove the phosphorus values by leaching. However, prior to the subject invention these efforts resulted in incomplete removal of the phosphorus leaving sufficient phosphorus associated with the metal values to render them undesirable for use in the metallurgical industries. This work is reported by Lloyd H. Banning and R. T. C. Rasmussen in Bureau of Mines Report of Investigations 4822.

It is readily apparent to those skilled in the art that a method of substantially completely separating phosphorus from ferrophosphorus so as to permit utilization of the phosphorus per se and recovery of valuable metallurgical components of ferrophosphorus represents a long sought-after advancement in the utilization of phosphorus furnace by-products.

SUMMARY OF THE INVENTION

It has been discovered that by heating ferrophosphorus in admixture with oxidizing agents and neutralizing agents as hereinafter described to at least sintering temperature in oxide refractory containers and leaching the reaction product the phosphorus values are substantially completely removed from the ferrophosphorus permitting utilization of the phosphorus values and recovery of the metal constituents of ferrophosphorus in industrially valuable form. The invention will be better understood from the following description of the preferred embodiments.

DESCRIPTION OF THE PREFERRED EMBODIMENTS

Any of the well-known ferrophosphorus by-products from electric furnace processes for manufacture of elemental phosphorus can be processed according to this invention. The processing of ferrophosphorus containing vanadium, chromium, and nickel values in accordance with this invention is particularly advantageous. It will be recognized by those skilled in the art that the metal values and phosphorus values of ferrophosphorus are present in the form of metal phosphides, and alloys as well as in elemental form and that reference to reaction of phosphorus for example refers equally to the reaction of elemental phosphorus and phosphorus contained in iron phosphide and that similar interpretations apply to references to other ingredients of ferrophosphorus.

It is essential that the process of this invention be conducted in a container having oxide refractory contact walls. The term container is used broadly to define apparatus supporting or confining the ferrophosphorus in admixture with oxidizing agents and neutralizing agents during heating in the process of this invention. Thus the container may be a kiln, crucible, furnace, hearth, or any other device commercially utilized to support or contain mixtures being heated. The term contact walls defines the walls of the container in contact with the mixture being heated during the process of this invention. That is, only the portion of the container in actual contact with the mixture being heated need be constructed of or have walls lined with oxide refractories.

Numerous oxide refractories suitable for use in high temperature operations are well known to those skilled in the art. Oxide refractories suitable for use as contact walls for containers in the process of this invention include fused alumina; high alumina firebrick, known industrially as super duty firebrick; medium high alumina firebrick, known industrially as fireclay firebrick; zirconia; magnesia; titania; beryllia; thoria; and the like. Alumina, zirconia, and super duty firebrick refractories are particularly preferred. It is emphasized that the refractories used in the practice of this invention must be oxide refractories. Refractories such as silicon carbide are unsuitable for use in the practice of the invention since, although such refractories are normally successfully utilized in operations at similar or even higher temperatures, it is found that their use in the practice of this invention does not result in complete removal of phosphorus from the ferrophosphorus.

In the practice of this invention, the ferrophosphorus is intimately admixed with an oxidizing agent and a neutralizing agent. Preferably, the ingredients are finely ground to 40 mesh U.S. standard sieve size, most preferably 100 mesh or less, to facilitate mixing.

The oxidizing agent utilized in the process of this invention will be an oxide of iron, nickel, or cobalt or mixtures thereof or a mixture of at least 10% by weight of such oxides with alkali metal carbonates. It will be recognized that metal oxide precursors e.g. iron hydroxides, which are converted to the oxides at the temperature of this process can be utilized and the term oxide is used to include such precursors. Similarly, the precursor may be a mixture of metallic iron, nickel, or cobalt or alloys thereof with oxygen or other oxidizing agent capable of converting the metal to its oxides at the process temperature. The oxidizing agent must be present in an amount at least 10% by weight in excess of the amount stoichiometrically required for conversion of the phosphorus in said ferrophosphorus to $P_2O_5$ and any vanadium and chromium in the ferrophosphorus to $V_2O_3$ and $Cr_2O_3$. The use of iron oxide as an oxidizing agent is particularly preferred in view of its low cost and availability.

The neutralizing agent serves to neutralize the acid oxides of phosphorus, chromium and vanadium formed by reaction of the oxidizing agent and ferrophosphorus and may be any alkali metal oxide, hydroxide or carbonate. The use of carbonates is particularly preferred since they additionally function as a portion of the oxidizing agent. The sodium oxides, hydroxides, and carbonates, are particularly preferred in view of the recognized value of the sodium phosphate products obtained. The neutralizing agent is utilized in an amount sufficient to convert substantially all phosphorus oxidization products formed by heating the phosphorus with the oxidizing agent to alkali metal phosphates. (The term "alkali metal phosphates" is intended to include phosphates containing other metals e.g. sodium iron phosphate.)

A particularly preferred combination of oxidizing agent and neutralizing agent is iron oxide and sodium carbonate in a weight ratio of from about 0.5:1 to about 3:1 (the iron oxide being expressed as $Fe_3O_4$) and providing a mole ratio of sodium to phosphorus of from about 1:1 to about 3:1, preferably about 1:1.

The mixture of ferrophosphorus, oxidizing agent, and neutralizing agent is heated to at least sintering temperature. This is required to effect complete reaction in a resonable period of time. If desired, the mixture can be heated to fusion temperatures or even higher temperatures. However, there is no particular advantage to be gained from use of higher temperatures and generally their use is undesirable from an economical viewpoint. Any conventional heating technique including induction heating may be utilized.

The process as practiced thus far convert the phosphorus values to soluble derivatives whereas the vanadium and chromium values remain in the form of insoluble oxides. The phosphorus values are removed by leaching the product with water or an aqueous solution of alkaline material such as alkali metal hydroxides and carbonates. Preferably, the alkaline materials will be present in a concentration of at least 1% by weight. Comminution of the sintered or fused product is desirable in order to facilitate the leaching operation which can be conducted at ambient or, preferably, elevated temperatures.

Alkali metal phosphates can be crystallized from the solution by cooling or evaporation. These phosphates are found to be substantially free of iron, chromium, or vanadium contamination.

Iron-nickel alloy is then separated from the leached product. This can be accomplished by magnetic separation or by conventional gravitational separation techniques.

The residue remaining after separation of the iron-nickel alloy can be treated in a variety of ways to recover the metal values contained therein. In one embodiment, this residue is admixed with sodium carbonate and heated to at least 750° C. for one hour or more and leached with water to dissolve vanadium and chromium values. Acidifying the leach solution precipitates $V_2O_5$ and the chromium is reclaimed as lead or sodium chromate. Alternatively the residue which contains non-magnetic iron oxide resulting from use of excess oxidizing agent can be heated in the presence of a reducing agent (e.g., carbon, carbonaceous material, reductive metals such as aluminum, magnesium, etc.) to yield a chromium-vanadium alloy steel.

The practice of the invention is further illustrated by the following example:

Example I. One hundred parts by weight ferrophosphorus analyzing about 26% phosphorus; 58.5% iron; 6% chromium; 8% vanadium; and 1.5% nickel is ground to less than 200 mesh U.S. standard sieve size and admixed with 190 parts iron oxide ($Fe_3O_4$) and 70 parts sodium carbonate.

The mixture is heated in an alumina container to a temperature of about 1,300° C. (sintering temperature is about 1,200° C.) for 15 minutes.

The sintered mix is crushed and leached with a 2.5% by weight solution of sodium carbonate at about 95° C. The leached residue contains less than 0.1% phosphorus. The leach solution is evaporated to yield trisodium phosphate free of iron, chromium, and vanadium.

Iron-nickel alloy is magnetically separated from the leached product. Residue is roasted with sodium carbonate at 900° C. for about 1.5 hours to form soluble sodium vanadates and sodium chromates which are leached from the iron oxide. The leached solution is acidified to a pH of 1 to precipitate $V_2O_5$ as red cake which is mechanically separated from the solution of sodium chromate.

What is claimed is:

1. A method of processing ferrophosphorus comprising the steps of:
   (a) heating said ferrophosphorus in intimate admixture with an oxidizing agent selected from the group consisting of oxides of iron, cobalt, and nickel and mixtures thereof and mixtures of at least 10% by weight of said oxides with alkali metal carbonates, said oxidizing agent being present in an amount at least 10% by weight in excess of the stoichiometric requirements for conversion of phosphorus in said ferrophosphorus to $P_2O_5$ and any vanadium and chromium in said ferrophosphorus to $V_2O_3$ and $Cr_2O_3$ and a neutralizing agent selected from the group consisting of alkali metal oxides, hydroxides, and carbonates said neutralizing agent being present in an amount sufficient to convert substantially all phosphorus oxidation products formed by heating said ferrophosphorus with said oxidizing agent to alkali metal phosphates in a container having oxide refractory contact walls to at least sintering temperature;
   (b) leaching the product formed in step (a), above, with a leaching medium selected from the group consisting of water and aqueous solutions of alkaline materials selected from the group consisting of alakali metal hydroxides and carbonates to remove phosphorus values therefrom.

2. The method of claim 1 wherein said oxide refractory is alumina.

3. The method of claim 1 wherein said oxidizing agent is iron oxide and the alkali metal of the neutralizing agent is sodium.

4. The method of claim 1 wherein said neutralizing agent is sodium carbonate and said oxidizing agent is a mixture of iron oxide and sodium carbonate.

5. The method of claim 4 wherein the weight ratio of iron oxide, expressed as $Fe_3O_4$, to sodium carbonate is from about 1.5:1 to about 3:1 and the mole ratio of sodium to phosphorus is from about 1:1 to about 3:1.

6. The method of claim 5 wherein said oxide refractory is alumina.

7. The method of claim 4 wherein the ferrophosphorus contains vanadium and chromium further comprising the step of separating iron-nickel alloy from the leached product.

8. The method of claim 7 further comprising mixing the residue remaining after separation of the iron-nickel alloy with sodium carbonate; heating the mixture to at least 750° C. for at least one hour; leaching with water to dissolve vanadium and chromium values; and acidifying the leach solution to precipitate $V_2O_5$.

9. The method of claim 7 further comprising heating the residue remaining after separation of the iron-nickel alloy in the presence of a reducing agent to yield a chromium-vanadium alloy steel.

References Cited

UNITED STATES PATENTS

| | | | |
|---|---|---|---|
| 1,376,160 | 4/1921 | Pelton | 75—133 X |
| 1,437,191 | 11/1922 | Paul | 22—223 X |
| 1,547,927 | 7/1925 | Kissock | 75—133 |
| 1,797,726 | 3/1931 | Larsson | 25—165 A |
| 2,467,039 | 4/1949 | Kerschbaum | 23—223 X |
| 3,076,248 | 2/1963 | Darrow | 23—223 X |
| 3,579,328 | 5/1971 | Aas | 75—133.5 |
| 3,250,612 | 5/1966 | Roy | 75—126 |
| 977,819 | 12/1910 | Mehner | 75—28 X |
| 2,320,342 | 6/1943 | Bridger | 75—28 X |

L. DEWAYNE RUTLEDGE, Primary Examiner

J. E. LEGRU, Assistant Examiner

U.S. Cl. X.R.

23—106; 75—56, 101, 129, 132, 6